L. B. MOULTON.
CONVERTIBLE TOURING CAR.
APPLICATION FILED NOV. 10, 1914.
1,189,990.
Patented July 4, 1916.
2 SHEETS—SHEET 1.
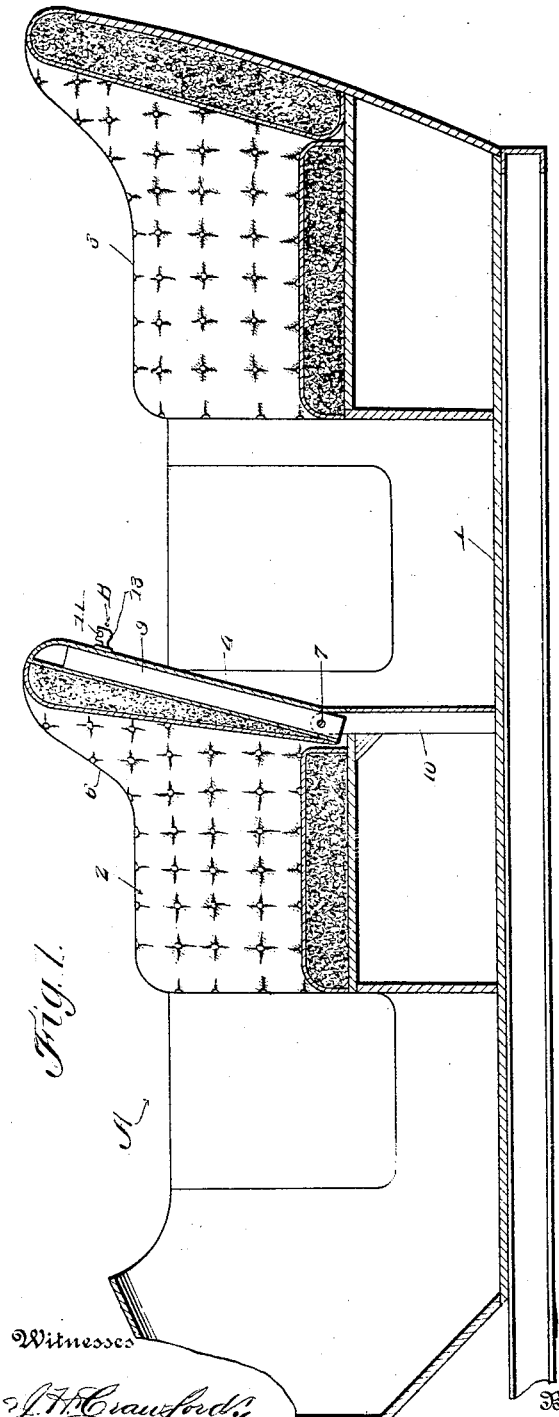
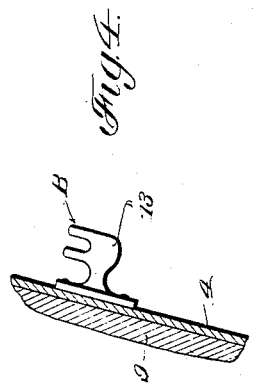
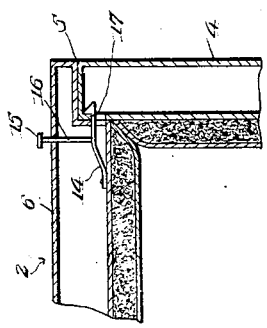
Witnesses
J. H. Crawford
R. M. Smith
Inventor
L. B. Moulton,
By Victor J. Evans
Attorney

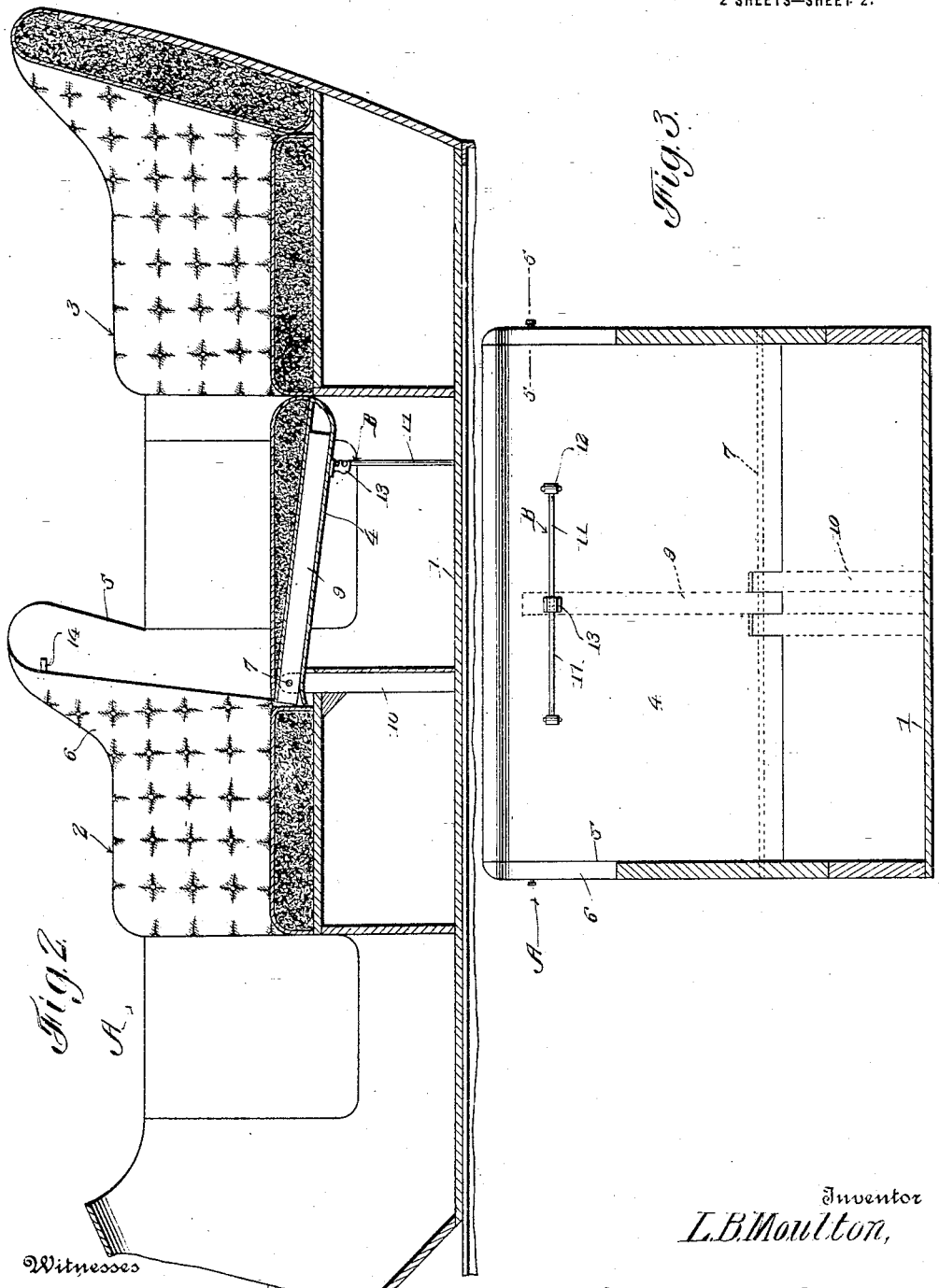

UNITED STATES PATENT OFFICE.

LESLIE B. MOULTON, OF DAIRY, OREGON.

CONVERTIBLE TOURING-CAR.

1,189,990.   Specification of Letters Patent.   Patented July 4, 1916.

Application filed November 10, 1914. Serial No. 871,345.

*To all whom it may concern:*

Be it known that I, LESLIE B. MOULTON, a citizen of the United States, residing at Dairy, in the county of Klamath and State of Oregon, have invented new and useful Improvements in Convertible Touring-Cars, of which the following is a specification.

This invention relates to a convertible touring car, the object in view being to provide simple and easily manipulated means whereby the back of the front seat of a touring car may be thrown backwardly into the plane of the rear seat cushion so as to provide a bed or lounge for the occupants, the invention embodying novel means for supporting the back of the front seat when so positioned as to form the bed or lounge.

With the above and other objects in view, the invention consists in the novel construction, combination and arrangement of parts, as herein described, illustrated and claimed.

In the accompanying drawings: Figure 1 is a vertical longitudinal section through a sufficient portion of an automobile to illustrate the application of the present invention thereto. Fig. 2 is a similar view showing the automobile converted into a sleeping car. Fig. 3 is an enlarged rear elevation of the front seat back. Fig. 4 is a fragmentary section through the back showing the keeper for the sections of the coat rail which forms supporting legs for the back when moved to a horizontal position. Fig. 5 is a detail cross section on the line 5—5 of Fig. 3.

Referring to the drawings A designates generally a sufficient portion of an automobile to illustrate the nature of the present invention, 1, designating the floor, 2 the front seat and 3 the rear seat.

In carrying out the present invention the back 4 of the front seat 2 is divided along the vertical lines 5 from the side uprights 6 of the front seat frame and the portion of the back 4 between the stationary uprights 6 is hinged to the latter by means of a horizontally extending rod 7 which passes entirely through the back 4 longitudinally of the latter and at a point above the bottom edge of the seat back, said hinged rod 7 passing through and being fastened in rigid relation to the uprights 6. The rod 7 forms the center of movement of the hinged section 4 of the seat back when said back is moved to the substantially vertical position shown in Fig. 1 or to the substantially horizontal position shown in Fig. 2.

Extending vertically and centrally of the back 4 is a center support 9 which is inclosed in the body of the back so as to be concealed. The support 9 is in the form of a bar which extends from a point near the top edge of the back 4 to a point near the bottom edge thereof, the hinge rod 7 passing through the support or bar 9. Parallel supports 10 arranged in spaced relation to each other extend from the floor 1 upwardly on opposite sides of and close to the support 9 and the hinge rod 7 passes also through said parallel supports 10. By means of the supports 9 and 10, the hinge rod 7 is supported at a central point between the stationary uprights 6 and the rod in turn supports the back 4 when turned downwardly to a substantially horizontal position as shown in Fig. 2.

The ordinary coat or robe rail designated generally at B is employed for the purpose of supporting the seat back when moved downwardly to the position shown in Fig. 2. For that purpose said rail B is divided centrally into two sections 11 each of which has a hinged connection at 12 with the seat back 4. The inner adjacent extremities of the rail sections 11 are adapted to be moved into and out of engagement with a supporting keeper 13 and when in said position, the sections 11 are in longitudinal alinement with each other and present the appearance of an ordinary coat rail as now used in automobiles. The hinge joints 12 are sufficiently loose to allow the free inner ends of the rail sections 11 to be moved into and out of engagement with the keeper 13. The length of the rail sections 11 is such that when the seat back is moved to the substantially horizontal position shown in Fig. 2, the lower extremities of said rail sections 11 rest against the floor 1, thereby forming supporting legs for the seat back.

When the hinged back 4 is in its normal position as shown in Fig. 1, it is maintained in that position by means of a pair of catches 14 arranged at opposite ends of the seat back and one of which is shown in the detail sectional view, Fig. 5. Each catch 14 is mounted in one of the uprights 6 so as to be concealed and is operated by means of a push button 15 which is connected with the catch 14 by means of a connecting stem 16. The catch 14 is adapted to engage a keeper or shoulder 17 on the adjacent edge of the hinged back 4.

When it is desired to convert the car from a touring car into a sleeping car, the buttons 15 are simultaneously pressed inwardly, thereby releasing the seat back 4. The back 4 is then swung rearwardly and downwardly to the substantially horizontal position shown in Fig. 2, the rail sections 11 being released from the keeper 13 at the same time. As the seat back moves downwardly, the supporting legs formed by the rail sections 11 also swing downwardly until they come in contact with the floor and support the back 4. As the upholstery on the back 4 extends below the hinge rod, it compensates for any space which would otherwise be left between the front seat cushions and the horizontally disposed back 4 and therefore a continuous cushion is provided from the edge of the front seat to the back of the rear seat. This forms a comfortable bed or cushion for two or more occupants. The parts may be restored to their normal positions for touring purposes in a moment.

What I claim is:—

A convertible touring and sleeping car comprising a front seat, a rear seat, a hinged back for the front seat adapted to be swung from its normal position to a substantially horizontal position between the front and rear seat cushions, supporting means for said seat back when in a substantially horizontal position consisting of a pair of supporting legs having a jointed connection with the back and adapted to be brought into alinement with each other to form a coat rail, and a slotted keeper fastened to the hinged back and adapted to receive and support the free ends of the legs when in coat-supporting position.

In testimony whereof I affix my signature in presence of two witnesses.

LESLIE B. MOULTON.

Witnesses:
CHARLES W. SHERMAN, Sr.,
HENRY HOCHSLER.